United States Patent [19]

Chen

[11] Patent Number: 5,241,881
[45] Date of Patent: Sep. 7, 1993

[54] HANDLEBAR ASSEMBLY FOR CYCLES

[75] Inventor: Chao F. Chen, Taichung Hsien, Taiwan

[73] Assignee: Kalloy Industrial Co., Ltd., China

[21] Appl. No.: 945,812

[22] Filed: Sep. 15, 1992

[51] Int. Cl.⁵ ............................................. B62K 21/14
[52] U.S. Cl. .................................. 74/551.2; 74/551.3; 280/276
[58] Field of Search .................. 74/551.1, 551.2, 551.3, 74/551.4; 280/276, 279

[56] References Cited

U.S. PATENT DOCUMENTS

| | | | |
|---|---|---|---|
| 4,939,950 | 7/1990 | Girvin | 74/551.2 |
| 5,138,900 | 8/1992 | Hals | 74/551.3 X |
| 5,181,436 | 1/1993 | Lai | 74/551.2 |
| 5,186,074 | 2/1993 | Arnold | 74/551.2 |

FOREIGN PATENT DOCUMENTS

| | | | |
|---|---|---|---|
| 67343 | 7/1948 | Denmark | 74/551.3 |
| 1003619 | 2/1957 | Fed. Rep. of Germany | 74/551.3 |
| 550313 | 3/1923 | France | 74/551.2 |
| 1050197 | 1/1954 | France | 74/551.2 |
| 399794 | 11/1942 | Italy | 74/551.3 |

*Primary Examiner*—Rodney H. Bonck
*Assistant Examiner*—Ryan W. Massey
*Attorney, Agent, or Firm*—Merchant Gould Smith Edell Welter & Schmidt

[57] ABSTRACT

A handlebar including a bracket fixed on top of a stem, a pair of lugs extended upward from the bracket and each having a curved groove, a shank having one end pivotally coupled between the lugs, a bracket disposed below the shank and coupled to the shank, a bolt extended through each of the grooves and engaged with the bracket, and a resilient member coupled between the shank and the bracket for absorbing vibrations and shocks transmitted to the handlebar.

3 Claims, 4 Drawing Sheets

HANDLEBAR ASSEMBLY FOR CYCLES

BACKGROUND OF THE INVENTION

1. Field of the Invention

The present invention relates to a handlebar assembly, and more particularly to a handlebar assembly for cycles.

2. Description of the Prior Art

A typical handlebar assembly for cycles is disclosed in U.S. Pat. No. 4,939,950 to Girvin, entitled "HANDLEBAR ASSEMBLY FOR CYCLES", filed Oct. 24, 1988, the handlebar assembly comprises a pivot arm pivotally coupled to the column member, and rubber spring elements provided for shock absorption purposes. However, the pivot arm and the tubular main portion supported thereon can not be rotated relative to the pivot axle thereof such that the height of the tubular main portion can not be adjusted.

The present invention has arisen to mitigate and/or obviate the afore-described disadvantages of the conventional handlebar assemblies.

SUMMARY OF THE INVENTION

The primary objective of the present invention is to provide a handlebar assembly in which the height of the handlebar can be adjusted.

In accordance with one aspect of the invention, there is provided a handlebar assembly comprising a stem, a bracket fixed on top of the stem and including a pair of lugs extended upward therefrom, each of the lugs including a curved groove formed therein, a shank including a first end pivotally coupled between the lugs at a pivot axle such that the shank is rotatable about the pivot axle, the grooves having a center of curvature coincided with the pivot axle, a bracket disposed below the shank and including a first end coupled to the shank and including a second end located between the lugs, a bolt extended through each of the grooves and slidably engaged in the grooves and engaged with the second end of the bracket, and resilient means coupled between the shank and the bracket for absorbing vibrations and shocks transmitted to the handlebar assembly. The shank is rotatable about the pivot axle such that the height of the handlebar supported on the shank can be adjusted.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is an exploded view of the handlebar assembly; and

DETAILED DESCRIPTION OF THE PREFERRED EMBODIMENT

Figure 1:
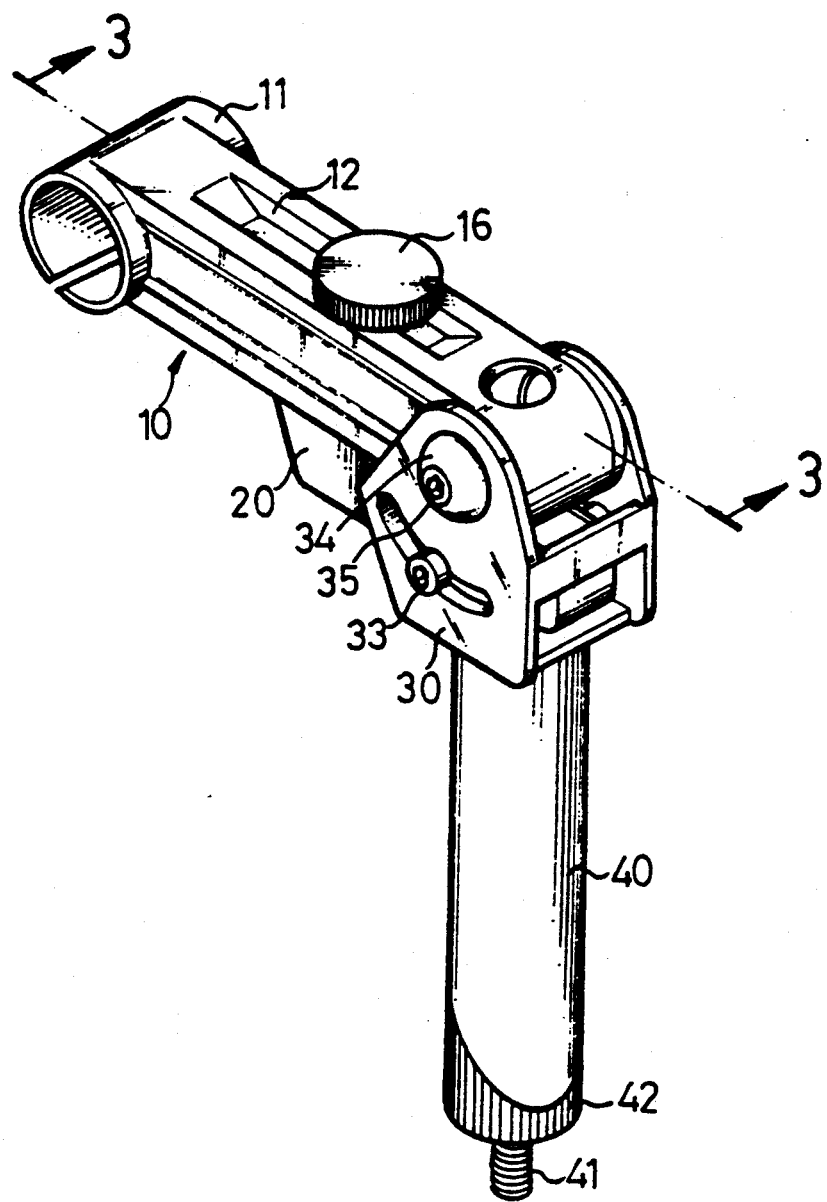
Figure 2:
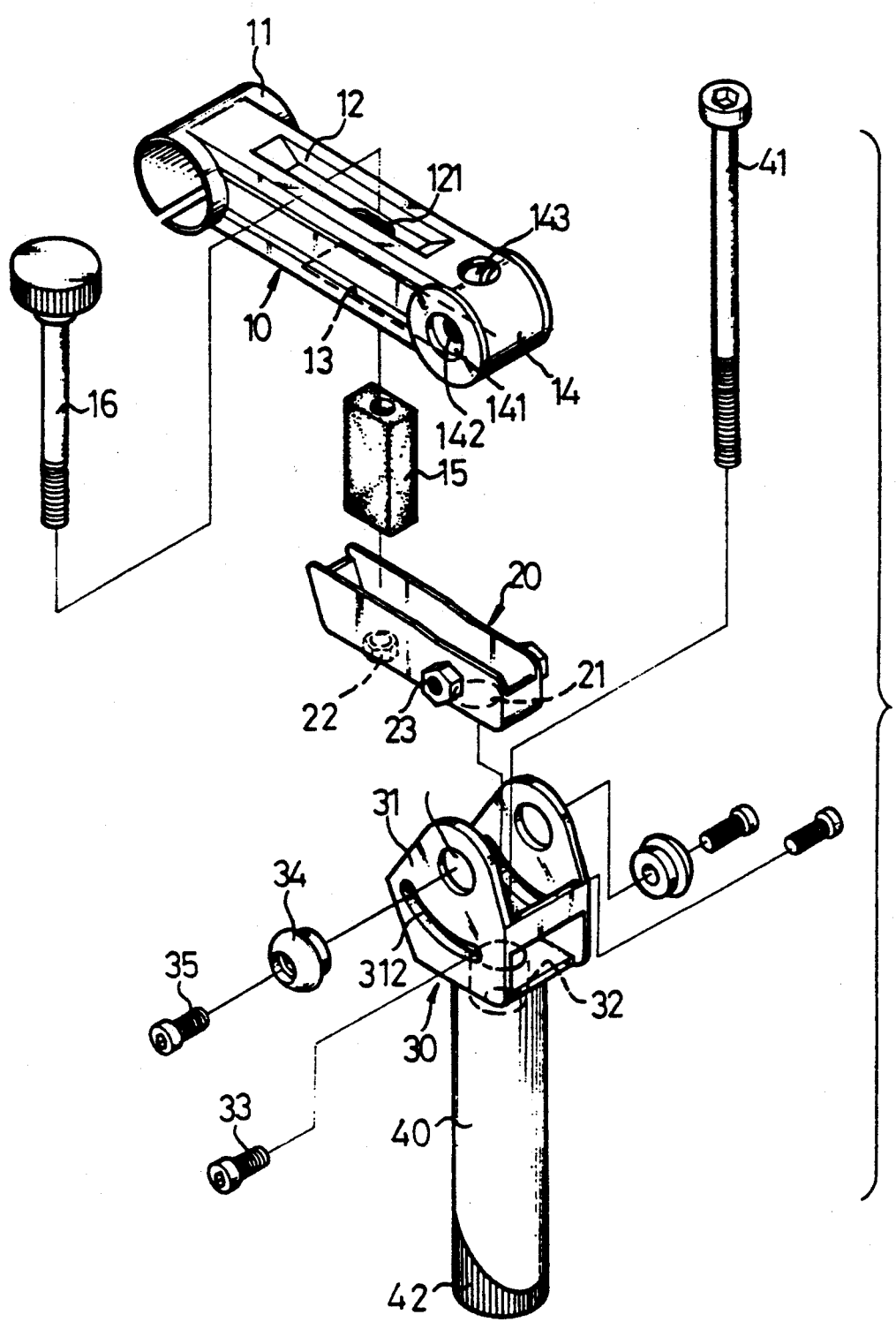
FIG. 2 is a perspective view of a handlebar assembly in accordance with the present invention.
Figure 3:
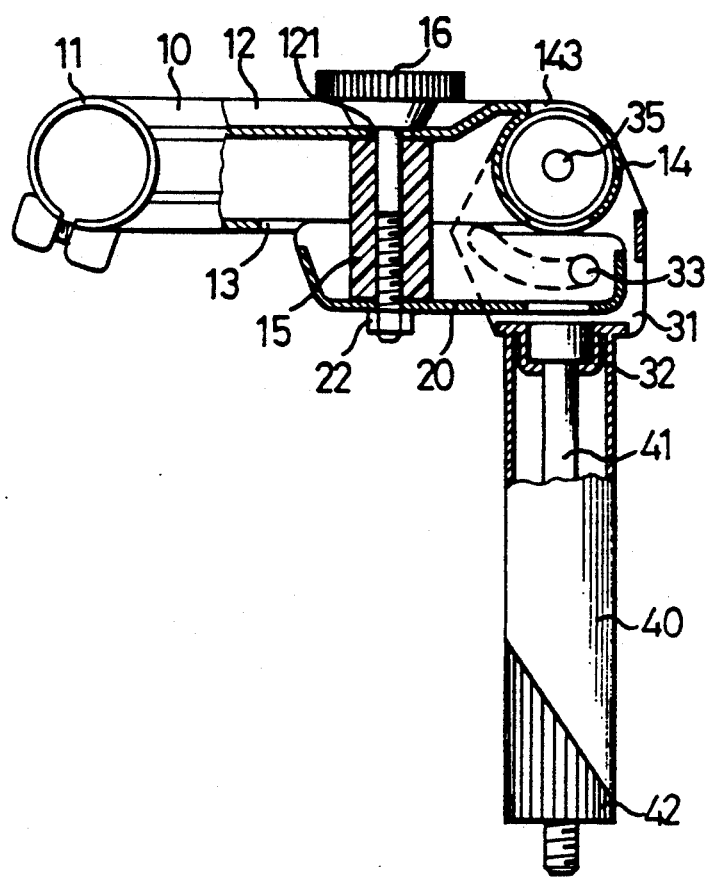
FIGS. 3 and 4 are cross sectional views taken along lines 3—3 of FIG. 1, illustrating the operations of the handlebar assembly.

Referring to the drawings, and initially to FIGS. 1 to 3, a handlebar assembly in accordance with the present invention comprises generally a shank 10 having a sleeve 11 formed on one end for receiving the handlebar element of the cycles (not shown) and having a stub 14 laterally formed in the other end thereof, the stub 14 includes a depression 141 and a screw hole 142 formed in each end thereof and an opening 143 vertically formed therein, the shank 10 includes a slot 12 formed in the upper portion thereof and includes a notch 13 formed in the bottom portion thereof, an oblong hole 121 is formed in the slot 12. A resilient member 15 is engaged in the notch 13 of the shank 10 and aligned with the oblong hole 121 of the shank 10.

A bracket 20 is engageable in the notch 13 of the shank 10 and includes a nut 22 fixed on one end thereof and aligned with the resilient member 15, a bolt 16 extends through the oblong hole 121 of the shank 10 and the resilient member 15 and threadedly engaged with the nut 22 so that the bracket 20 can be coupled to the shank 10 and so that the resilient member 15 can be retained between the shank 10 and the bracket 20, an opening 21 is formed in the bottom portion of the bracket 20 and aligned with the opening 143 of the stub 14 of the shank 10, and two nuts 23 are fixed on the side portions of the bracket 20.

A frame 30 is fixed on top of a stem 40, which is fixed on top of the frame fork of the bicycle, and includes a pair of lugs 31 extended upward therefrom, each of the lugs 31 includes an aperture 311 and a curved groove 312 formed therein, the curved groove 312 has a center of curvature coincided with the aperture 311, the stub 14 of the shank 10 is engaged between the lugs 31 and pivotally coupled between the lugs 31 by two pairs of shafts 34 and bolts 35 such that the shank 10 is rotatable about the axis formed by the shafts 34, the shank 10 can be maintained in any suitable angular position when the bolts 35 are fully threaded to engage with the screw holes 142 of the stub 14, the shafts 34 extend through the respective apertures 311 of the lugs 31 and are engaged in the respective depressions 141 of the stub 14. A bolt 33 extends through each of the curved grooves 312 and threadedly engaged with the nuts 23 such that the bracket 20 can be fixed to the lugs 31. The frame 30 includes a cylindrical support 32 formed integral on the bottom portion thereof and extended in the upper portion of the stem 40, and a bolt 41 extends through the support 32 and threadedly I engaged with a wedge 42 such that the stem 40 can be fixed in the frame fork of the bicycle.

Figure 4:
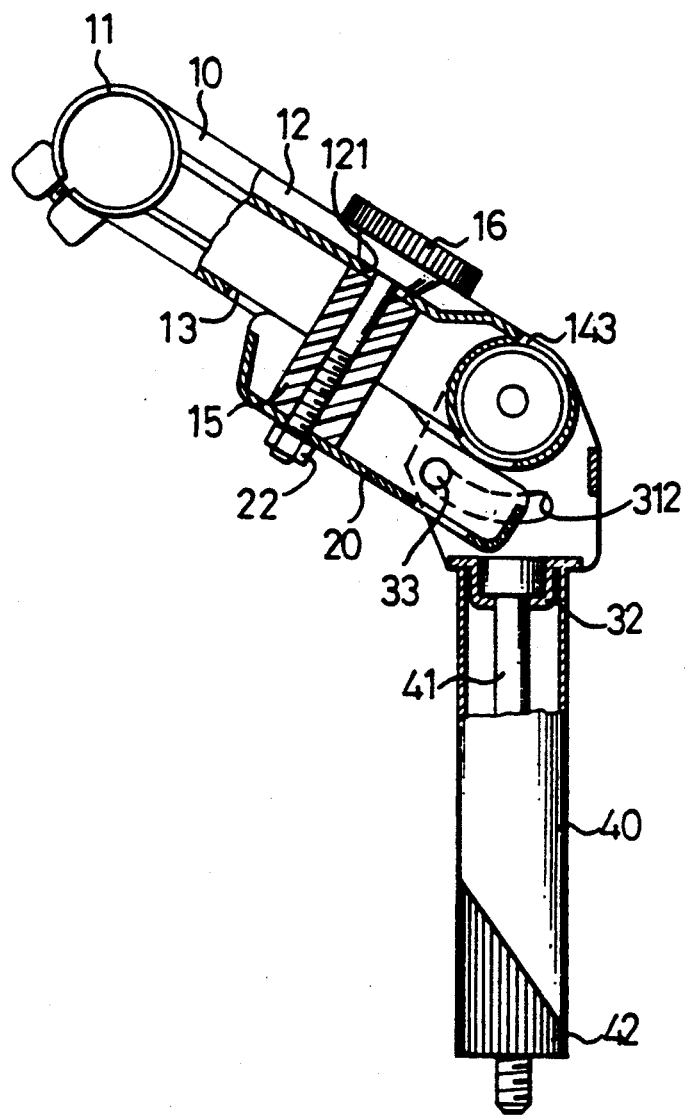

As shown in FIG. 3, the shank 10 is located in a horizontal position; however, when the bolts 35 and the bolts 33 are loosened, the shank 10 is rotatable about the axis formed by the shafts 34, and the bolts 33 are rotatable about the respective grooves 312, such that the shank 10 and the bracket 20 may be rotated to the position as shown in FIG. 4, the shank 10 and the bracket 20 can be maintained in the position when the bolts 33 and 35 are threaded into place. Accordingly, the height of the handlebar can be adjusted.

It is to be noted that the resilient member 15 is disposed between the shank 10 and the bracket 20 in order to absorb the shocks and vibrations transmitted to the handlebar assembly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handlebar assembly Comprising a stem, a bracket fixed on top of said stem and including a pair of lugs extended upward therefrom, each of said lugs including a curved groove formed therein, a shank including a first end pivotally coupled between said lugs at a pivot axle such that said shank is rotatable about said pivot axle, said grooves having a center of curvature coincided with said pivot axle, a bracket disposed below said shank and including a first end coupled to said shank and including a second end located between said lugs, a bolt extended through each of said grooves and slidably engaged in said grooves and engaged with said second end of said bracket, and resilient means coupled between said shank and said bracket for absorbing vibrations and shocks transmitted to said handlebar assembly.

2. A handlebar assembly according to claim 1, wherein said shank includes a stub formed integral on said first end thereof, a shaft extends through each of said lugs and engaged to said stub so as to form said pivot axle, a bolt extends through each of said shafts and is threadedly engaged to said stub so as to fix said lugs and said stub together.

3. A handlebar assembly according to claim 1, wherein said shank includes a notch formed in a bottom portion thereof, said bracket is engageable in said notch of said shank, a bolt extends through said shank and said resilient means and is threadedly engaged with said bracket such that said resilient means is coupled between said shank and said bracket.

* * * * *

UNITED STATES PATENT AND TRADEMARK OFFICE
CERTIFICATE OF CORRECTION

PATENT NO.   :   5,241,881
DATED        :   September 7, 1993
INVENTOR(S)  :   Chao F. Chen It is certified that error appears in the above-identified patent and that said Letters Patent is hereby corrected as shown below:

Cover sheet, item [73] after Assignee "China" should read --Republic of China--.

Column 1, line 53 "Fig. 2" should read --Fig. 1--.

Column 2, line 43 delete "I" after the word "threadedly".

Column 3, line 1 "Comprising" should read --comprising--.

Signed and Sealed this

Thirteenth Day of September, 1994

Attest:

BRUCE LEHMAN

Attesting Officer    Commissioner of Patents and Trademarks